(12) United States Patent
Weber et al.

(10) Patent No.: US 7,199,958 B2
(45) Date of Patent: Apr. 3, 2007

(54) SERVO HEAD WITH VARYING WRITE GAP WIDTH

(75) Inventors: Mark P. Weber, Oakdale, MN (US); Yung Yip, Afton, MN (US)

(73) Assignee: Imation Corp., Oakdale, MN (US)

( * ) Notice: Subject to any disclaimer, the term of this patent is extended or adjusted under 35 U.S.C. 154(b) by 135 days.

(21) Appl. No.: 10/927,403

(22) Filed: Aug. 25, 2004

(65) Prior Publication Data

US 2006/0044671 A1    Mar. 2, 2006

(51) Int. Cl.
*G11B 5/09*  (2006.01)
*G11B 5/584*  (2006.01)

(52) U.S. Cl. ............. 360/48; 360/77.12; 360/122
(58) Field of Classification Search ............ None
See application file for complete search history.

(56) References Cited

U.S. PATENT DOCUMENTS

| | | | |
|---|---|---|---|
| 5,689,384 A | 11/1997 | Albrecht et al. | |
| 5,898,533 A | 4/1999 | Mantey et al. | |
| 5,995,315 A | 11/1999 | Fasen | |
| 6,021,013 A | 2/2000 | Albrecht et al. | |
| 6,023,385 A | 2/2000 | Gillingham et al. | |
| 6,134,070 A | 10/2000 | Tran et al. | |
| 6,241,674 B1 | 6/2001 | Phillips et al. | |
| 6,271,786 B1 | 8/2001 | Huff et al. | |
| 6,312,384 B1 | 11/2001 | Chiao | |
| 6,363,107 B1 | 3/2002 | Scott | |
| 6,381,261 B1 | 4/2002 | Nagazumi | |
| 6,385,268 B1 | 5/2002 | Fleming et al. | |
| 6,400,754 B2 | 6/2002 | Fleming et al. | |
| 6,462,904 B1 * | 10/2002 | Albrecht et al. | ............ 360/122 |
| 6,549,360 B1 | 4/2003 | Xuan et al. | |
| 2001/0053174 A1 | 12/2001 | Fleming et al. | |
| 2002/0093640 A1 | 7/2002 | Watanabe et al. | |

OTHER PUBLICATIONS

"Pulse Compression Recording," Dent III et al., *IEEE Transactions on Magnetics*, vol. MAG-12, No. 6, Nov. 1976, pp. 743-745.
"Amplitude-Based Servo Patterns for Magnetic Media," Molstad et al., U.S. Appl. No. 10/464,394, filed Jun. 17, 2003.
"Multi-Band Servo Patterns with Inherent Track ID," Molstad et al., U.S. Appl. No. 10/704,958, filed Nov. 10, 2003.
"Servo Patterns with Inherent Track ID," Yip et al., U.S. Appl. No. 10/704,959, filed Nov. 10, 2003.
"Servo Writing Devices for Creating Servo Patterns with Inherent Track ID," Yip et al., U.S. Appl. No. 10/705,041, filed Nov. 10, 2003.

* cited by examiner

*Primary Examiner*—William Korzuch
*Assistant Examiner*—Daniell L. Negrón
(74) *Attorney, Agent, or Firm*—Eric D. Levinson

(57) ABSTRACT

A servo head comprising a write gap with a non-uniform width is described. It allows non-uniform width servo marks to be recorded on magnetic media. A servo head having a non-uniform width gap may create servo marks that facilitate servo position error signal calculations using time-based methods, amplitude-based methods, or both. This invention provides alternative methods for positioning servo heads and may increase reliability and precision by allowing redundant calculations.

20 Claims, 11 Drawing Sheets

SERVO HEAD WITH VARYING WRITE GAP WIDTH

TECHNICAL FIELD

The invention relates to data storage media and, more particularly, to magnetic storage media recorded with servo patterns.

BACKGROUND

Data storage media are commonly used for storage and retrieval of data and come in many forms, such as magnetic tape, magnetic disks, optical tape, optical disks, holographic disks or cards, and the like. In magnetic media, data is typically stored as magnetic signals that are magnetically recorded on the medium surface. The data stored on the medium is typically organized along "data tracks," and transducer heads are positioned relative to the data tracks to read or write data on the tracks. A typical magnetic storage medium, such as magnetic tape, usually includes several data tracks. Optical media, holographic media and other media formats can also make use of data tracks.

As the number of data tracks on a medium increases, the data storage capacity of the medium likewise increases. However, as the number of data tracks increases, the tracks usually become narrower and more crowded on the medium surface. Accordingly, an increase in the number of data tracks can make positioning of the transducer head relative to a desired data track more challenging. In particular, for proper data storage and recovery, the transducer head must locate each data track, and follow the path of the data track accurately along the media surface. In order to facilitate precise positioning of the transducer head relative to the data tracks, servo techniques have been developed.

Servo patterns refer to signals or other recorded marks on the medium that are used for tracking purposes. In other words, servo patterns are recorded on the medium to provide reference points relative to the data tracks. A servo controller interprets a detected servo pattern and generates a position error signal (PES). The PES is used to adjust the lateral distance of the transducer head relative to the data tracks so that the transducer head is properly positioned along the data tracks for effective reading and/or writing of data to the data tracks.

With some data storage media, such as magnetic tape, the servo patterns are stored in specialized tracks on the medium, called "servo tracks." Servo tracks serve as references for the servo controller. A plurality of servo tracks may be defined in a servo band. Some magnetic media include a plurality of servo bands, with data tracks being located between the servo bands.

The servo patterns recorded in the servo tracks may be sensed by one or more servo heads. Once the servo head locates a particular servo track, one or more data tracks can be located on the medium according to the data track's known displacement from the servo track. The servo controller receives detected servo signals from the servo heads and generates PESs, which are used to position a read/write head accurately relative to the data tracks.

Two general categories of servo patterns are amplitude-based servo patterns and time-based servo patterns. Amplitude-based servo patterns refer to servo patterns in which detection of magnetic servo signal amplitudes can enable identification of head position relative to the medium. Time-based servo techniques refer to servo techniques that make use of non-parallel servo marks and time variables or distance variables to identify head position.

Conventional amplitude-based servo patterns typically include servo "windows" adjacent to the servo tracks. The servo windows may comprise regions where a magnetic signal has been erased from the medium, and may be arranged in a checkerboard-like configuration to define a plurality of servo tracks. As a servo head passes relative to the medium, it detects a signal amplitude relative to a proportion of the servo head that passes over servo windows positioned along a servo track. In this manner, the precise location of servo tracks adjacent the servo windows can be identified. Amplitude-based servo patterns are commonly implemented in magnetic tape media, but may also be useful in other media.

When time-based servo techniques are used, the time offset between the detection of two or more servo marks can be translated into a PES, which defines a lateral distance of the transducer head relative to a data track. For example, given a constant velocity of magnetic tape formed with servo pattern "/\", the time between detection of mark "/" and mark "\" becomes longer when the servo head is positioned towards the bottom of pattern "/\" and shorter if the servo head positioned towards the top of pattern "/\". Given a constant velocity of magnetic media, a defined time period between detected servo signals may correspond to a center of pattern "/\". By locating the center of pattern "/\", a known distance between the center of the servo track and the data tracks can be identified. Time-based servo patterns are also commonly implemented in magnetic tape media, but may be useful in other media.

SUMMARY

In general, the invention is directed to servo techniques that make use of servo marks having non-uniform widths at different locations across a data storage medium. Magnetic tape recorded with such servo patterns are described, and servo heads having write gaps with non-uniform widths, which can be used to record the servo patterns on the magnetic tape, are also described. According to an embodiment of the invention, for example, a servo mark having a trapezoidal shape is positioned such that two sides of the trapezoid are parallel to a servo track. In that case, the mark has a non-uniform width across the magnetic tape. A "width" in a servo mark having a non-uniform width is a measurement along a line that is parallel to a track within a magnetic media. Described servo marks having non-uniform widths may allow servo-positioning methods similar to time-based servo methods, amplitude-based methods, or both.

In one embodiment, the invention is directed to a data storage tape comprising a servo pattern. The servo pattern includes a servo mark recorded by a non-uniform gap of a servo recording head. A width of the servo mark in a down tape direction is non-uniform across the tape. The servo mark may be trapezoidal in shape, but may also assume other shapes having non-uniform widths. In addition, other uniform-width marks may be included in the servo pattern to provide reference points for interpretation of a readout signal of the non-uniform width mark.

In another embodiment, the invention is directed to a method comprising detecting a servo signal measured from a magnetically recorded servo mark that extends across a magnetic tape in a cross-tape direction. A width of the magnetically recorded servo mark, defined in a down-tape direction, is non-uniform across the tape in the cross-tape direction.

In another embodiment, the invention is directed to a servo head comprising a write gap that corresponds to a servo mark to be recorded in a magnetic medium. A width of the write gap is non-uniform. The servo head may comprise a magnetic head that creates a magnetic field strength across the write gap which is non-uniform as a function of the width of the gap. The servo head may further comprise one or more additional write gaps defining uniform widths, which can be used to record reference marks for interpretation of a readout signal of a non-uniform mark recorded by the non-uniform gap.

Various aspects of the invention can provide a number of advantages. In general, servo patterns that make use of non-uniform width servo marks serve as alternatives to conventional servo positioning techniques. The described pattern may be used with time-based or amplitude-based decoding scenarios. In time-based applications, a single non-uniform mark can replace a conventional pattern requiring at least two marks. In that case, the leading edge of the non-uniform mark may be analogous to a conventional mark "/" and a trailing edge of the non-uniform mark may be analogous to a conventional mark "\." Because the non-uniform mark is recorded by a single gap, however, the distance between the leading and trailing edges of the non-uniform mark may be more accurate and consistent than distances between marks of conventional patterns "/\".

In amplitude based settings, the amplitude of the playback signal associated with a non-uniform mark can vary as a function of the width of the mark. In other words, the signal amplitude detected by a readout head may vary depending on the width of the mark in the area passed by the head. The mark itself can provide for varying signal amplitude, in contrast to conventional amplitude-based servo windows, which define fully erased regions of a recorded signal to define tracks adjacent the windows.

Moreover, the invention may allow for both time-based and amplitude-based servo decoding techniques to be used. This may result in improved servo precision, and possibly redundancy in PES calculation. The details of several embodiments of the invention are set forth in the accompanying drawings and the description below. Other features, objects, and advantages of the invention will be apparent from the description and drawings, and from the claims.

DETAILED DESCRIPTION

The invention is directed to servo techniques that make use of servo marks having non-uniform widths at different locations across a data storage medium. Magnetic tapes having such servo patterns are described, and servo heads having non-uniform write gaps, which can be use to record the servo patterns on magnetic tape, are also described. As one example, the servo mark may have a trapezoidal shape such that the width of the mark (defined in a down tape direction) is different at different cross-tape locations. The top and bottom sides of the trapezoidal shape mark may be parallel to one another, and parallel to the servo track and the edge of the tape.

Additional marks, such as uniform width marks, may be included in the servo pattern to provide references for interpretation of the output signal associated with the non-uniform width mark. The non-uniform width mark may be decoded using a signal amplitude of the mark, or may be decoded in a manner similar to the decoding of conventional time-based servo patterns. In some cases, both signal amplitude and timing may be used to provide form improved servo accuracy and redundancy in PES generation.

Figure 1:
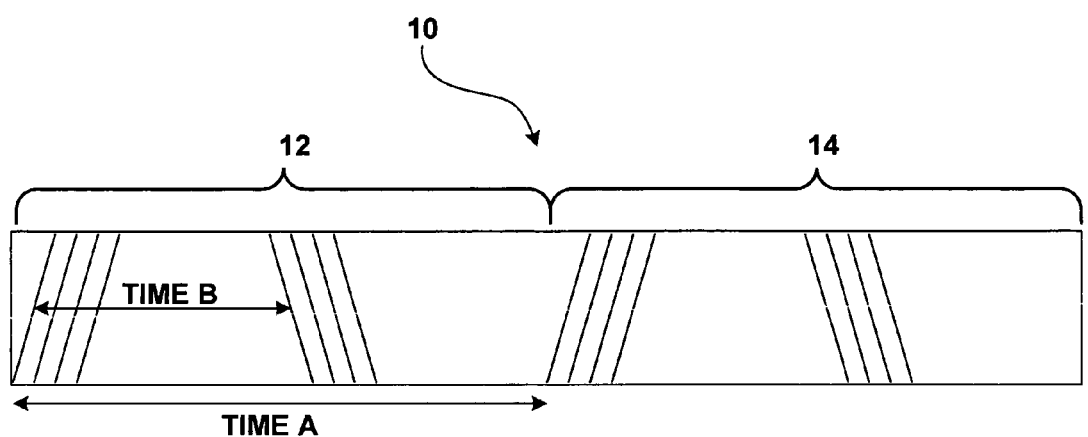
FIG. 1 is a conceptual view illustrating a servo band portion of a prior art magnetic tape recorded with a conventional time-based servo pattern.

FIG. 1 is a conceptual view illustrating a prior art servo track 10. Two frames, 12 and 14, of servo track 10 are illustrated. Time-based servo techniques make use of individual markings within servo frames 12 and 14, as illustrated in FIG. 1, to facilitate positioning of a transducer head relative to data tracks. Data tracks (not shown) reside a known distance from servo track 10. Thus, by locating a position of a servo head relative to servo track 10, a PES can be generated to identify lateral positioning error of the transducer head relative to the data track(s).

As illustrated in FIG. 1, time A represents the time associated with one servo frame, whereas time B represents the time between two specific groups of servo marks, in this case, the time between detection of servo frame 12 and servo frame 14. Time A is generally fixed, regardless of the lateral position of a servo head that detects the markings. However, time B changes depending on the position of a readout head. For example, time B becomes larger as the position of a servo readout head is moved towards the bottom of servo track 10. Given a constant speed of magnetic tape formed with servo track 10, time B can be use to generate a PES. Alternatively, the ratio of time B to time A can be used to generate a PES. In the later case, time A can normalize the ratio to account for any variance in tape speed.

Figure 2:
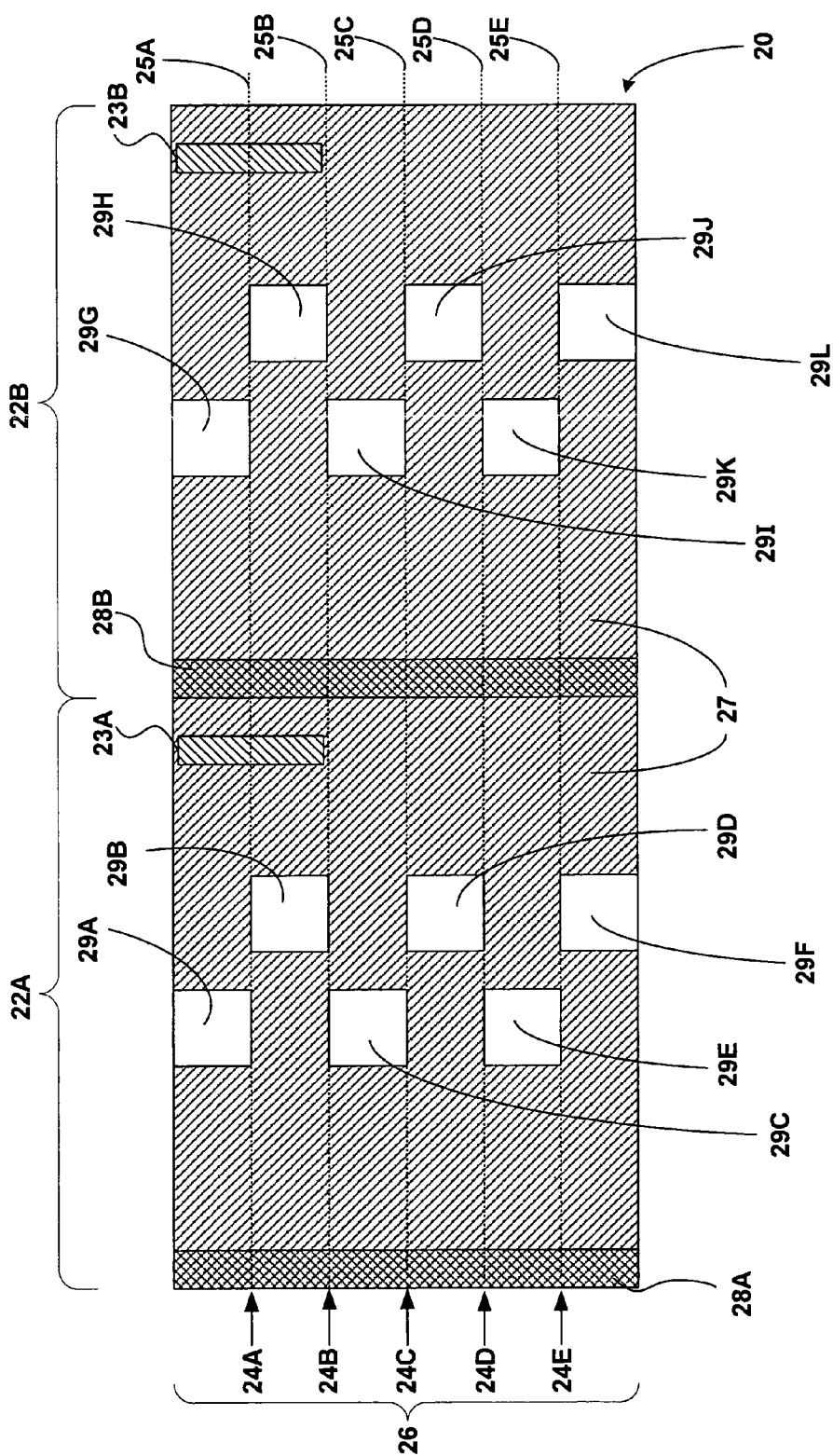
FIG. 2 is a conceptual view of a servo band portion of a prior art magnetic tape recorded with a conventional amplitude-based servo pattern.

FIG. 2 is conceptual view of a servo band portion of a prior art magnetic tape 20 recorded with conventional amplitude-based servo pattern 22. The conventional servo pattern illustrated in FIG. 2 includes a number of servo windows 29A–29L (collectively servo windows 29). Servo windows 29 may comprise areas where a recorded magnetic signal 27 has been erased from magnetic tape 20. Magnetic tape 20 includes a number of servo tracks 24A–24E (collectively servo tracks 24) that define centerlines 25A–25E (collectively centerlines 25). As a head moves over magnetic tape 20, relative to one of servo tracks 24, the strength of the magnetic signal detected by the head can identify the location of the head relative to a given centerline.

For example, as a servo head (not shown) moves partially over servo window 29A along centerline 25A, the detected signal amplitude should reduce by 50 percent if the head is precisely on-track. The detected signal is 100 percent when the head is not passing over a servo window, but reduces when the head passes partially over a servo window because the part of the head passing over the servo window is not exposed to a signal. If the detected signal amplitude falls by an amount greater or less than 50 percent as the head passes partially over servo window 29A along centerline 25A, then the head can be moved to better position the head over centerline 25A. In this manner, centerlines 25 of servo tracks 24 can be located. Corresponding data tracks (not shown) are located at defined displacements from centerlines 25 of servo tracks 24.

The conventional servo pattern in FIG. 2 includes two servo frames 22A and 22B (collectively servo frames 22). Each frame includes five servo tracks 24A, 24B, 24C, 24D and 24E (collectively servo tracks 24). These five servo tracks 24 collectively define a servo band 26. In general, a servo band is defined as a collection of a plurality of servo tracks. Thus, a servo band could include any number of servo tracks. Each of servo tracks 24 may reside a known distance from a corresponding data track or set of data tracks (not shown).

The servo pattern of FIG. 2 can be written by passing the magnetic tape under gaps of a servo write head. A relatively long gap in the servo head can be used to record a magnetic signal 27 having a first frequency on the surface of magnetic tape 20. Moreover, a magnetic signal having a second frequency may define transition regions 28A and 28A (collectively transition regions 28) between the individual frames. In order to record transition regions 28, the frequency of the written signal is changed for a short period of time while the tape passes under the long gap in the servo head. Transition regions 28 can serve as synchronization marks in the prior art servo detection scheme.

A servo write head (or a separate erase head) having a relatively short write gap track length in the direction transverse to the servo track direction can be used to create erased servo windows 29. For example, erased servo windows 29 may form a checkerboard-like configuration that enables a read head to pinpoint track locations. In accordance with the prior art, the erased servo windows 29 positioned above and below centerlines 25 have a common uniform width.

In operation, as magnetic tape 20 passes by a read head (not shown), positioned over a first track 24A, the signal from erased servo windows 29A and 29B, or 29G and 29H, relative to magnetic servo carrier signal 27, can accurately define the track location of the servo head. Similarly, the locations of tracks 24B–24E can be defined by the various erased servo windows 29 relative to magnetic pattern 27. Detection of transition regions 28 provides a synchronization mechanism so that when a signal amplitude indicates head position is off-track, the servo controller can determine whether to cause movement of the servo head laterally up or down in order to remedy the off-track head positioning. With common sized servo windows 29, the head controller could become out of sync if transition regions 28 or another type of synchronization mechanism are not recorded on magnetic tape 20 between servo frames 22.

Magnetic tape 20 also includes track identification marks 23A and 23B (collectively track identification marks 23). Track identification marks 23 allow a servo controller to distinguish track 24A from tracks 24C and 24E. Without track identification marks 23 on magnetic tape 20, the detected signals associated with tracks 24A, 24C and 24E are generally indistinguishable. For this reason, magnetic tape 20 includes track identification marks 23 to distinguish track 24A from tracks 24C and 24E. For example, track identification marks 23 may comprise a magnetic signal having a different discernable frequency than signal 27. Track identification marks 23 are conventionally shaped different from servo windows 29. Other servo bands may include track identification marks similar to marks 23, but positioned differently, so that tracks 24C, 24D and 24E can be identified when corresponding tracks of a plurality of servo bands are read simultaneously.

The invention provides an alternative to conventional servo patterns, such as those illustrated in FIGS. 1 and 2. As mentioned above, the invention is directed to servo techniques that make use of servo marks having non-uniform widths at different locations across a data storage medium. A "width" in a servo mark having a non-uniform width is a measurement along a line that is parallel to a track within a magnetic media. In various embodiments, the width of the non-uniform mark may vary over the length of the mark by greater than 2 microns, and preferably by greater than 4 microns. The width variance should not be too excessive, however, and may vary by less than 10 microns, and preferably by less than 8 microns.

The non-uniform width in the servo mark corresponds to a non-uniform width of a magnetic gap on a servo head used to record the servo mark. The non-uniform mark may define a trapezoid-like shape, although other shapes defining non-uniform widths could also be used. For example, a servo mark according to an embodiment of the invention may have a trapezoidal shape and can be positioned such that two sides of the trapezoid are parallel to a servo track of the magnetic tape. In that case, the mark has non-uniform width across the magnetic tape. The two parallel sides of the trapezoidal shape may also be parallel to the edge of the tape.

Figure 3:
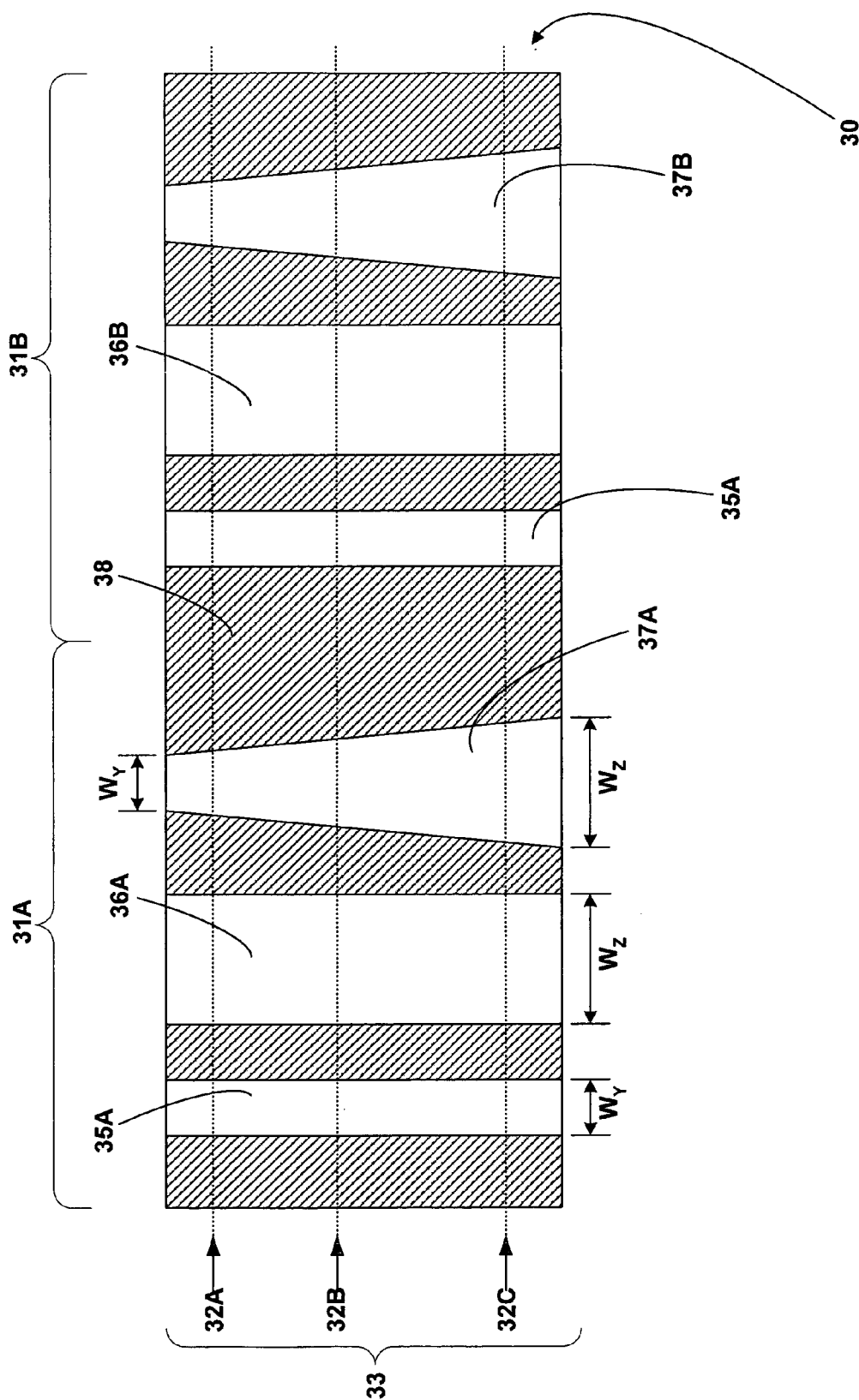
FIG. 3 is a conceptual view of a repeating servo pattern recorded on a magnetic data storage medium in accordance with an embodiment of the invention.

FIG. 3. is a conceptual view of a servo band portion of a magnetic tape 30 according to an embodiment of the invention. Servo frames 31A and 31B (collectively servo frames 31) may define any number of servo tracks 32A–32C (collectively servo tracks 32). Servo frames 31 repeat over the length of tape 30, with a plurality of servo frames 31 defining a servo pattern.

The servo pattern allows for servo track positioning at any increment along servo band 33. In other words, servo tracks 32 are just examples, and any number of servo tracks may be defined. Each of the servo tracks 32 resides a known distance from a corresponding data track (not shown). In some cases, a number of data tracks may be defined with respect to each one of servo tracks 32.

Servo marks 37A and 37B (collectively marks 37) allow for a method of time-based servo positioning similar to the method used in conventional time-based servo positioning. For example, given a known media velocity, the period of time from when the front edge of servo mark 37A is detected by a servo head until the back edge of servo mark 37A is detected correlates to a width at that head position. This can be translated into a PES, which defines a lateral distance of a transducer head relative (not shown) to a data track (not shown). For example, given a constant velocity of magnetic tape 30, the period of time servo mark 37A is detected becomes longer when the servo head is positioned towards the bottom of servo mark 37A and shorter when the servo head is positioned towards the top of servo mark 37A. Each of servo tracks 32 corresponds to a different defined width of servo marks 37. Given a known distance between the center of one of servo tracks 32 and the data tracks, the data tracks can be identified by locating one of servo tracks 32 within servo mark 37A.

A servo head having a gap with a trapezoidal shape may cause servo marks 37 non-uniform magnetizations as a function of the non-uniform widths. The shape of servo marks 37 is substantially the same as the shape of the gap used to record servo marks 37. A magnetic field strength of a servo write head correlates to the width of the servo head gap. Therefore, a non-uniform field strength will occur across a non-uniform gap. For example, the maximum field strength would occur at the narrowest part of the servo head gap and the minimum field strength would occur at the widest point. The magnetization recorded within the servo mark is dependent on both the magnetization curve of the magnetic media and the field strength across the gap that records the servo mark. Therefore, in order to create a non-uniform magnetization across the entire width of servo marks 37, the field strength across the gap used to record the marks should be such that the maximum field strength would not be strong enough to saturate magnetic tape 30.

Consequently, a detected amplitude of magnetization of servo marks 37 may correlate to a unique lateral position. By measuring the signal amplitude received as a servo read head passes over mark 37A or 37B, the lateral position of the servo head relative to magnetic tape 30 can be determined. The data tracks may be identified by determining the lateral position of a servo head and using a known distance between the servo head location on servo track 33 and the data tracks.

Additional marks 35A, 35B (collectively marks 35) and marks 36A, 36A (collectively marks 36) can provide a calibration mechanism. For example, marks 35 and 36 may define constant widths so that the measured width of marks 37 can be compared to a fixed standard. As illustrated, marks 35 and 36 may define widths Wy, and Wz, respectively, that correspond to the minimum and maximum width of marks 37. Given a consistent electric pulse for each write gap, this would cause servo marks 35 to have a magnetization equal to the maximum magnetization in servo marks 37. However, in other embodiments, the additional constant width marks may have any widths, as long as the widths are known by the servo controller. Furthermore, some embodiments may not require constant width servo marks to calibrate a non-uniform width mark. For example, a servo frame comprising two trapezoidal servo marks, the second being inverted relative to the first, would create a servo track along the lateral position where the amplitude of magnetization of the first trapezoidal servo mark equaled the amplitude of magnetization of the second.

Figure 4:
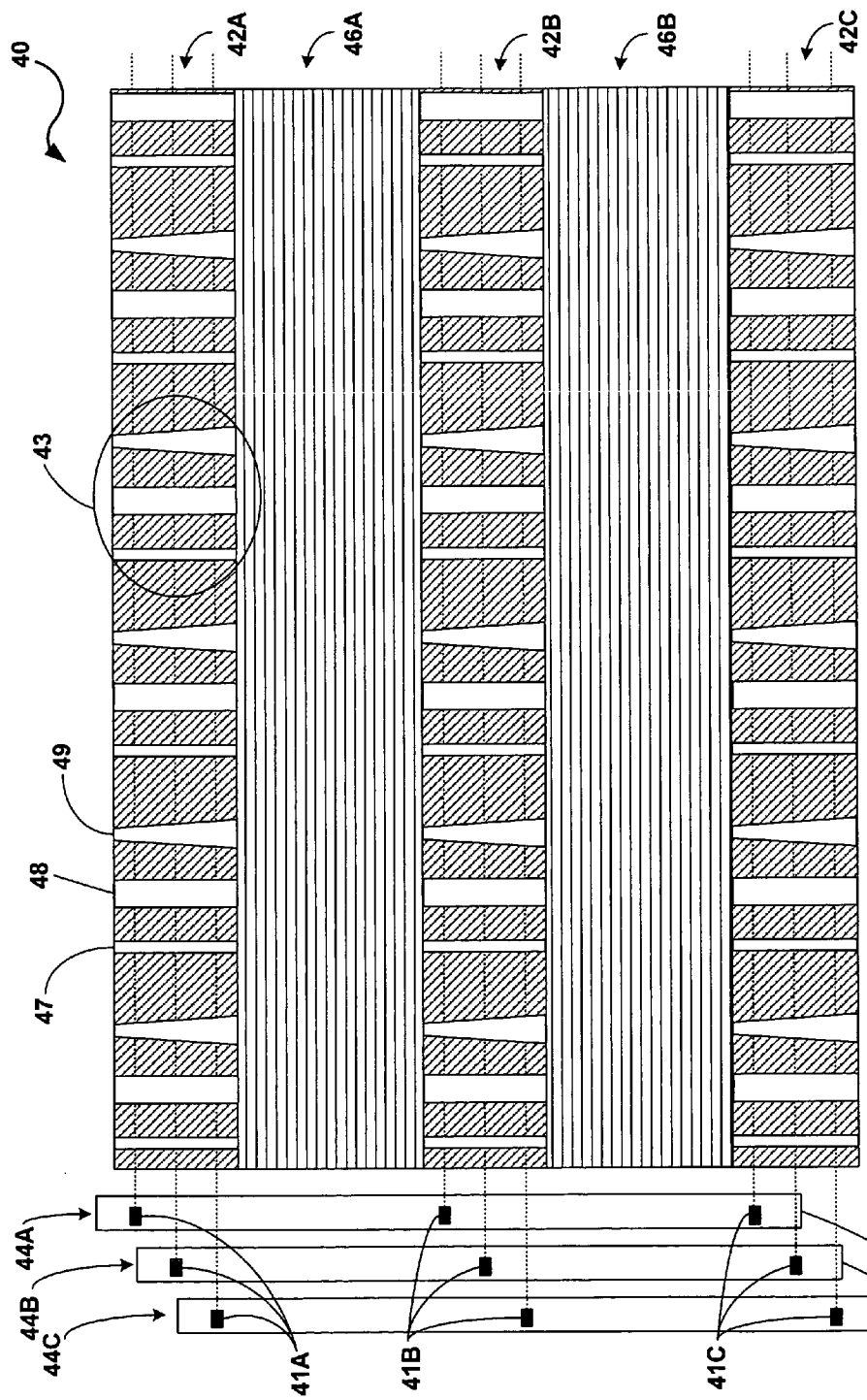
FIG. 4 is a conceptual view of magnetic tape recorded servo patterns according to an embodiment of the invention.

FIG. 4 is a conceptual view of magnetic tape 40 relative to a servo read module 45 including three servo heads 41A, 41B, and 41C (collectively heads 41). In particular, servo read module 45 is illustrated in three exemplary locations relative to magnetic tape 40. Magnetic tape 40 includes servo bands 42A, 42B and 42C (collectively servo bands 42). Data tracks 46A and 46A (collectively tracks 46) are positioned relative to servo bands 42. Each servo band 42 defines a plurality of servo tracks. In particular, servo tracks 44A, 44B, and 44C correspond to possible servo tracks of servo bands 42. Servo bands 42 include repeating servo frame 43, similar to that described in greater detail in the description of FIG. 3. As servo heads 41 pass over servo bands 42, servo heads 41 receive signals from the servo marks. From these signals, the position of servo heads 41 can be calculated as described herein.

In FIG. 4, servo frame 43 repeats identically in servo bands 42. In other embodiments, however, servo frames may be arranged differently in different servo bands 42 to distinguish between servo bands 42A, 42B and 42C. For example, the order of servo marks 47–49 could be varied in different bands. Moreover, the distance between marks or repeating servo frames would be varied to encode linear positioning information within servo bands 42. As another variation on the invention, an additional mark or marks may be included in the servo pattern to encode information such as linear positioning information.

Figure 5:
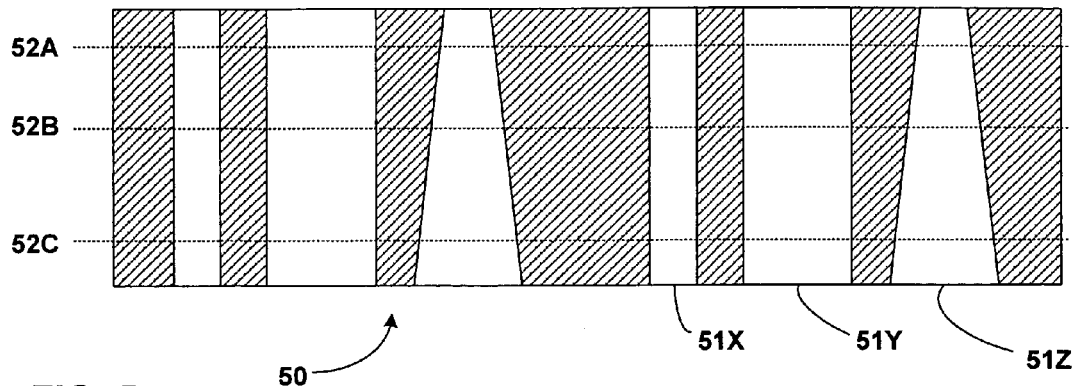
FIG. 5 is another depiction of a repeating servo pattern recorded on a magnetic data storage medium in accordance with an embodiment of the invention.
Figure 6A:
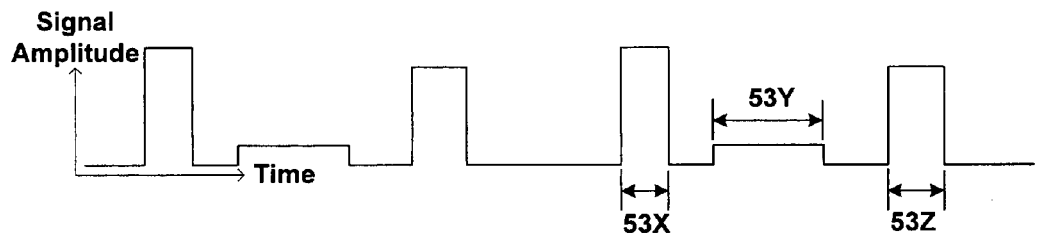
FIGS. 6A–6C illustrate exemplary output signals associated with a servo head passing over the servo pattern in FIG. 5.
Figure 6B:
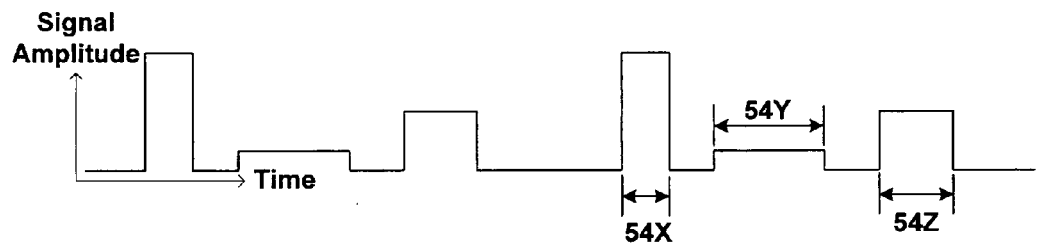
Figure 6C:
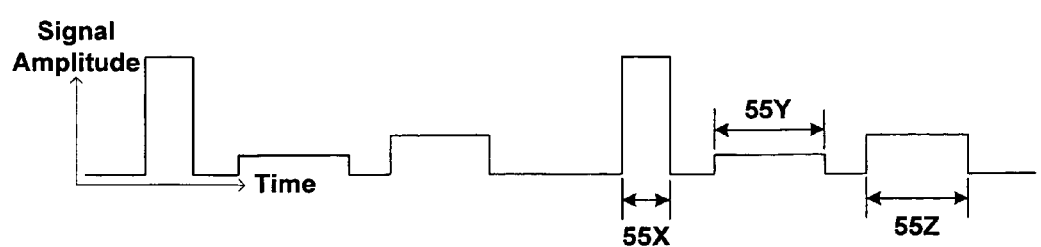

FIG. 5 a depiction of a repeating servo pattern recorded on a magnetic data storage medium. FIGS. 6A, 6B and 6C illustrate example magnetic signals produced when a servo head (not shown) passes over servo tracks 52A, 52B and 52C respectively. Given a constant magnetic media velocity, distances 53X, 53Y, 53Z, 54X, 54Y, 54Z, 55X, 55Y, and 55Z in FIGS. 6A–6C each correspond to a period of time the servo head would take to pass over a respective servo mark. Servo track 52A corresponds to magnetic signal FIG. 6A, servo track 52B corresponds to magnetic signal FIG. 6B, and servo track 52C corresponds to magnetic signal FIG. 6C.

Distances 53X, 54X and 55X correspond to signals received by the servo head as it passed over servo mark 51X along servo tracks 52A, 52B and 52C respectively. Distances 53X, 54X and 55X are equal to each other because servo mark 51X has a constant width. Similarly, distances 53Y, 54Y and 55Y correspond to servo mark 51Y. Distances 53Y, 54Y and 55Y are also equal to one another. Distances 53X, 54X, 55X, 53Y, 54Y and 55Y may be useful in a precise determination of media velocity for a time-based PES calculation.

Distances 53Z, 54Z and 55Z correspond to a signal received by the servo head as it passed over servo mark 51Z. Distances 53Z, 54Z and 55Z each correspond to a unique servo track within servo band 50, which is caused by the non-uniform width of servo mark 51Z. For example, as a servo read head passes along servo track 52A and over servo mark 51Z, it detects a relatively short signal corresponding to servo mark 51Z. The length of time that the signal from mark 51Z occurs is proportional to length 53Z as shown in FIG. 6A. In comparison, if the servo read head instead travels along servo tracks 52B or 52C, it would detect a signal from 51Z for a relatively longer time, corresponding to distance 54Z or distance 55Z. However, the use of the term "servo track" may be misleading because the invention allows for precise positioning at any position on servo band 50, rather than at incremental positions. Every possible servo head position within servo band 50 generally corresponds to a unique time period servo mark 51Z would be detected by the servo head. In general, the leading and trailing edges of mark 51Z can be interpreted in a manner analogous to the interpretation of two conventional time-based servo marks "/" and "\".

Figure 7:
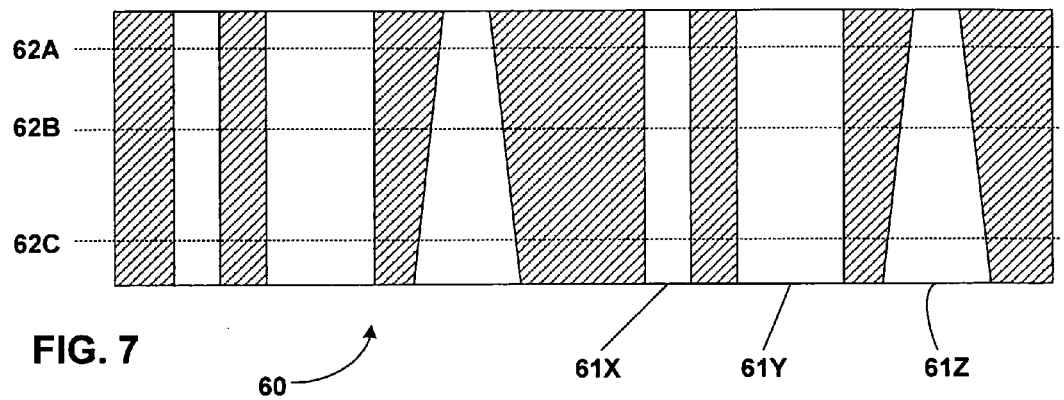
FIG. 7 is another depiction of a repeating servo pattern recorded on a magnetic data storage medium in accordance with an embodiment of the invention.
Figure 8A:
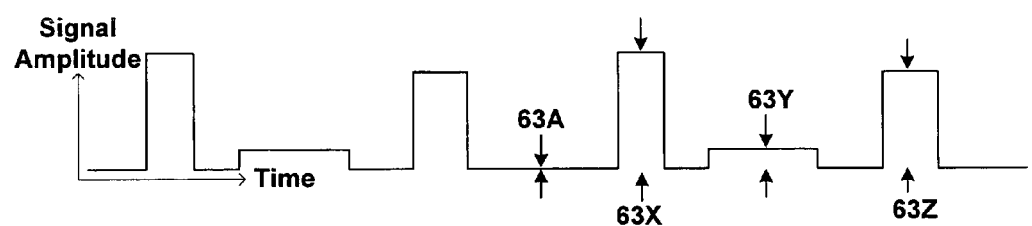
FIGS. 8A–8C illustrate exemplary output signals associated with a servo head passing over the servo pattern in FIG. 7.
Figure 8B:
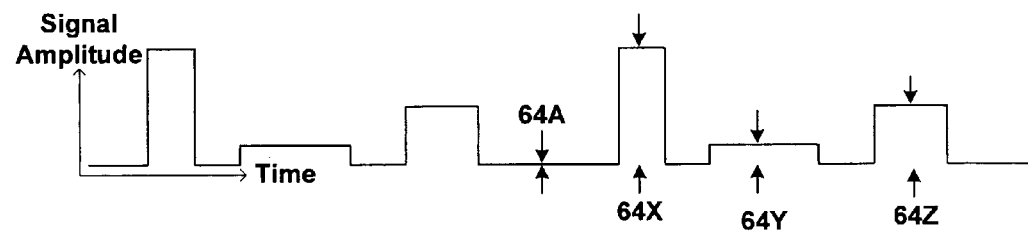
Figure 8C:
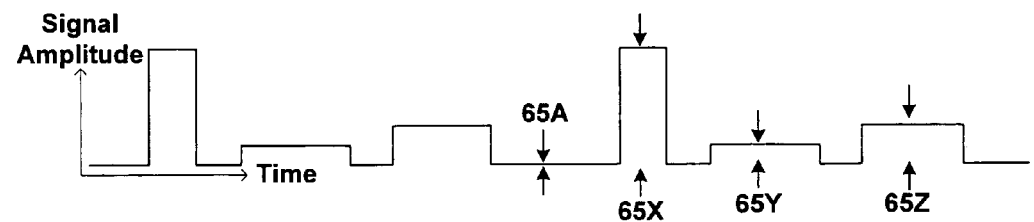

FIG. 7 is another depiction of a repeating servo pattern recorded on a magnetic data storage medium in accordance with an embodiment of the invention. FIGS. 8A–8C illustrate exemplary output signals associated with a servo head passing over the servo pattern in FIG. 7. FIGS. 7 and 8A–8C are substantially identical to FIGS. 5 and 6A–6C. Distances 63A, 63X, 63Y, 63Z, 64A, 64X, 64Y, 64Z, 65A, 65X, 65Y, and 65Z in FIGS. 8A–8C represent a magnetic signal amplitude. FIGS. 8A–8C correspond to signals received from a servo head as it passed over servo tracks 62A, 62B and 62C. Servo marks 61X and 61Y each have a constant width and also a constant magnetic signal amplitude for every servo head position within the servo band 60. Servo mark 61Z, however, has a non-uniform width and a non-uniform magnetic signal amplitude, which varies as a function of width.

In this embodiment, the amplitude of a servo signal from servo mark 61Z varies as a function of the width of the mark. The amplitude corresponding to servo mark 61Z is amplitude 63Z at track 62A. In contrast, the amplitude of servo mark 61Z is amplitude 64Z at track 62B, which is substantially smaller than amplitude 63Z.

In amplitude-based settings, if servo mark 61X defines a width that is the same as the minimum width of servo mark 61Z, then the magnetization of servo mark 61X should be the same as the magnetization at the minimum width of servo mark 61Z. Similarly, if servo mark 61Y defines a width that is the same as the maximum width of servo mark 61Z, then the magnetization of servo mark 61Y should be the same as the magnetization of mark 61Z at its widest point. Servo marks 61X and 61Y may be used as references points to allow PES calculation based on a detected magnetic signal amplitude of servo mark 61Z. However, while it may be convenient for servo marks 61X and 61Y to define the maximum and minimum widths of servo mark 61Z, any two servo marks having different constant widths could serve to calibrate the PES calculated from the magnetic signal amplitude of servo mark 61Z. Also, other non-uniform marks could also be used to enable calibration, as long as the servo controller is properly programmed to expect such marks.

FIGS. 8A–8C illustrated exemplary servo signals identified during readout of servo marks 61. In this exemplary embodiment, marks 61 are recorded on a medium in a servo track that is randomly magnetized prior to servo recording. In other embodiments, however, the servo tracks can be magnetized in a common direction, with the servo marks being erased portions of the servo tracks or being marks that are magnetized in an opposite direction than the servo track.

In still other embodiments, time-based positioning techniques using signals such as those illustrated in FIGS. 6A–6C may be used in conjunction with amplitude-based positioning techniques using signals such as those illustrated in FIGS. 8A–8C. In that case, the use of both time-based and amplitude-based positioning may allow for a more precise PES generation and redundancy.

Figure 9:
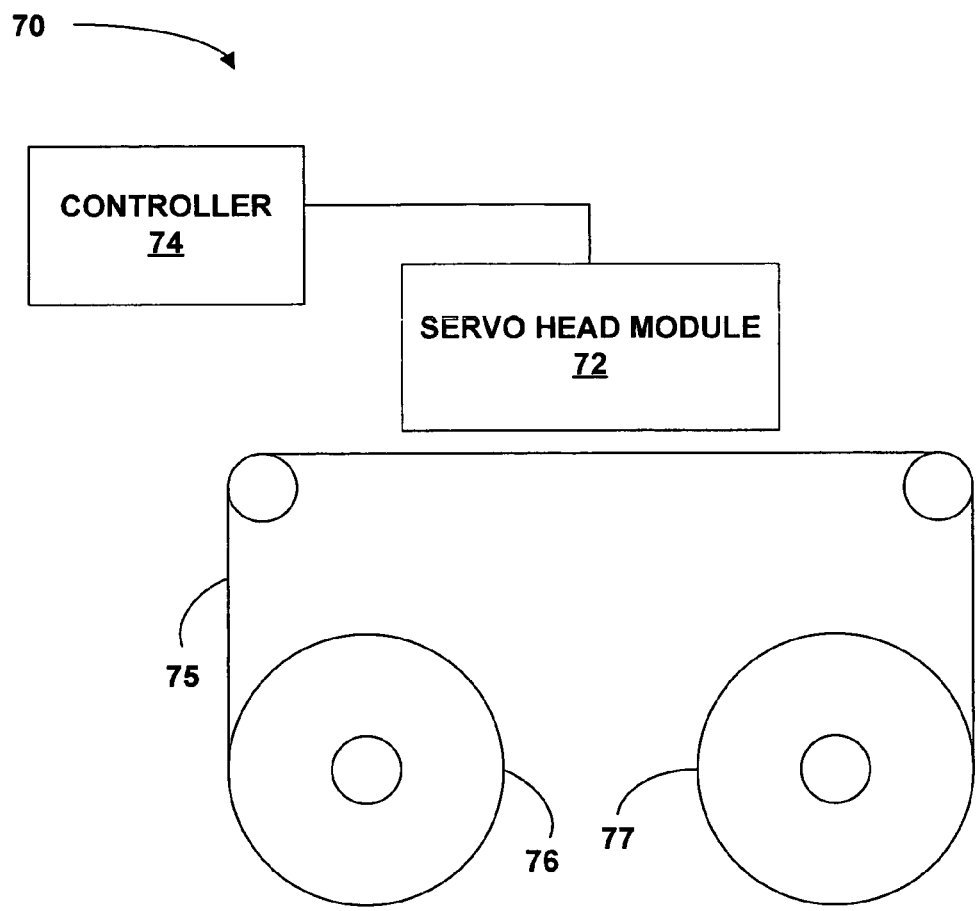
FIG. 9 is a block diagram illustrating an exemplary servo writing system for pre-recording servo patterns on magnetic tape.
Figure 12A:
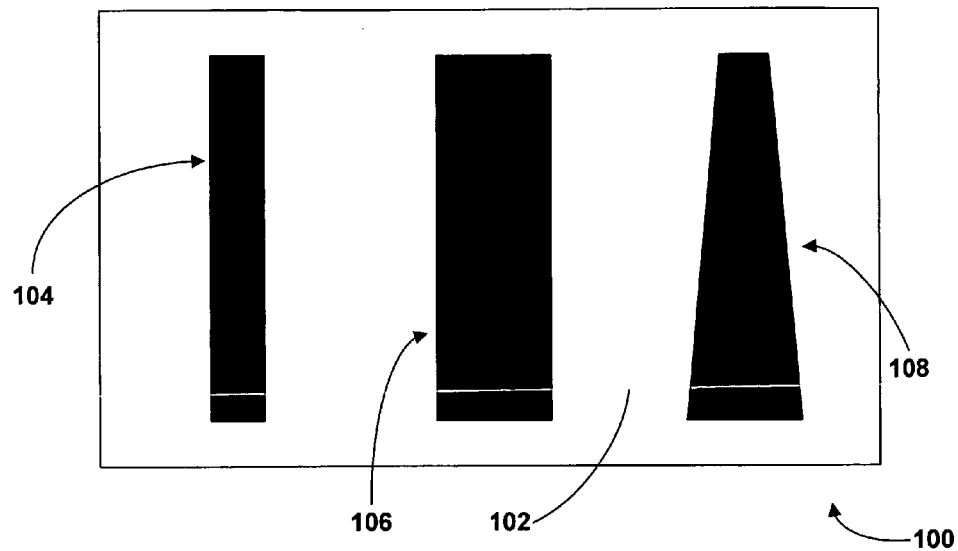
FIG. 12A is a top view of an exemplary servo head according to an embodiment of the invention.
Figure 12B:
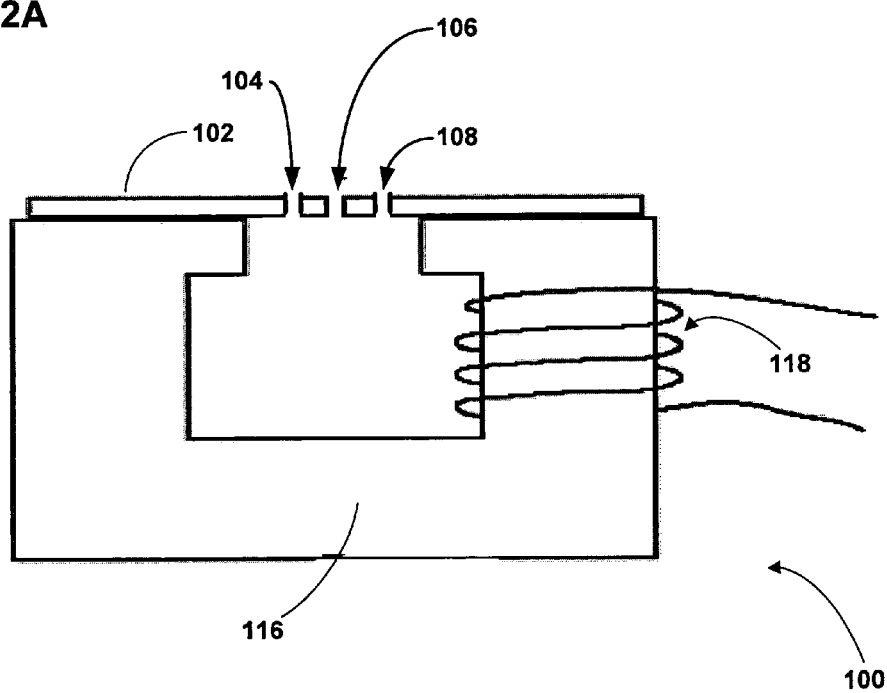
FIG. 12B is a side view of the exemplary servo head illustrated in FIG. 12A.
Figure 13A:
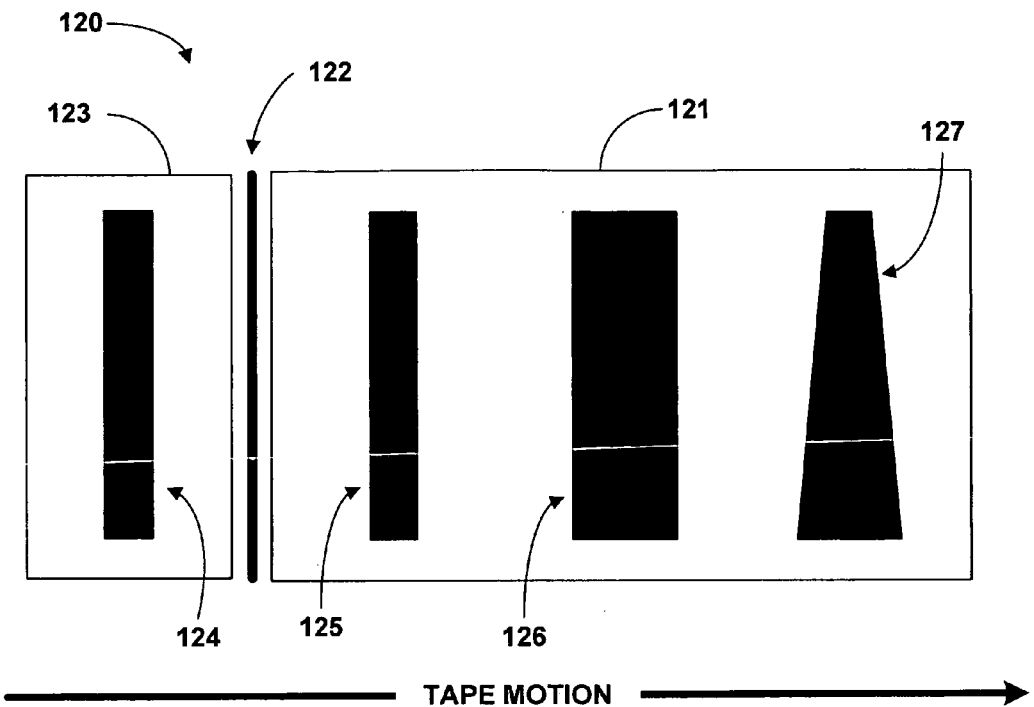
FIG. 13A is a top view of an exemplary servo head module comprising a first head and a second head separated by a conductive shield.
Figure 13B:
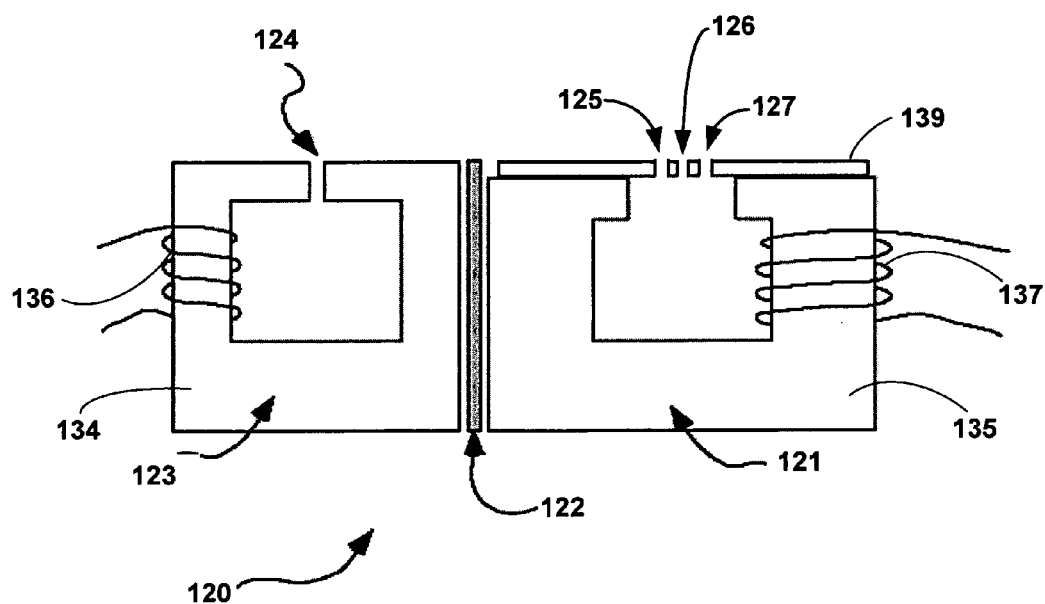
FIG. 13B is a side view of the exemplary servo head module illustrated in FIG. 13A.

FIG. 9 is a block diagram illustrating an exemplary servo writing system 70 for pre-recording servo patterns on magnetic tape 75. System 70 includes servo head module 72, servo controller 74, and magnetic tape 75 spooled on spools 76 and 77. Servo head module 72 may contain two servo heads, as shown in FIGS. 13A and 13B, a single servo head as shown in FIGS. 12A and 12B, or multiple servo heads (not shown). Controller 74 controls the magnetic fields applied by the one or more servo heads of servo head module 72. Magnetic tape 75 feeds from spool 76 to spool 77, passing in close proximity to servo head module 72. For example, magnetic tape 75 may contact the one or more servo heads of servo head module 72 during servo recording.

Servo head module 72 comprises electromagnetic elements that generate magnetic fields. In one embodiment, controller 74 may cause a first servo head to write substantially over the full servo band associated with magnetic tape 75. Then controller 74 can cause at least one additional servo head within servo head module 72 to selectively erase servo marks within the prerecorded servo band.

In a different embodiment, the servo band portion of magnetic tape 75 may be randomly magnetized. Controller 74 may cause at least one servo head within servo head module 72 to write servo marks within a randomly magnetized servo band Predetermined distances between the servo marks may be unique for each servo band. Also, the distances between servo frames may also be varied. In these ways, the servo pattern may allow for inherent servo band identification and also for encoding linear position information.

Figure 10:
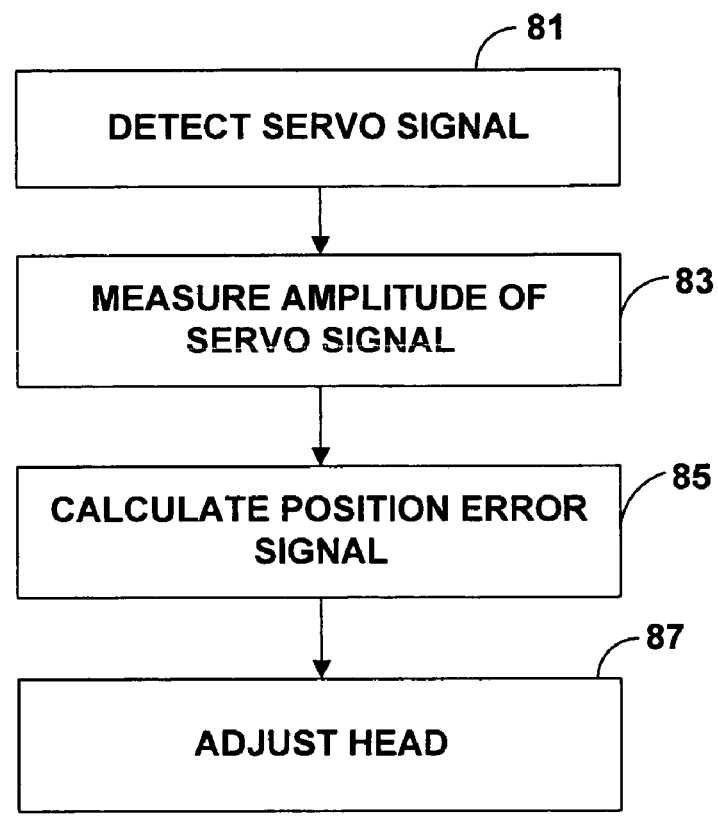
FIG. 10 is a flow diagram illustrating an amplitude-based method for adjusting a servo head's position according to an embodiment of the invention.

FIG. 10 is a flow diagram illustrating an amplitude-based method for adjusting a servo head's position according to an embodiment of the invention. As shown, a servo read head detects a servo signal (81). This detected servo signal corresponds to a servo mark with a non-uniform magnetization that varies as a function of lateral position. Next, a servo controller measures the amplitude of the detected servo signal (83). Then, the servo controller calculates a PES based on the amplitude of the detected servo signal (85). The PES calculation may also rely on calibration inputs measured from other servo signal amplitudes. An actuator may adjust the servo head and one or more data heads based on the PES from the servo controller (87). The procedure of FIG. 10 may be repeated in closed-loop fashion, to maintain precise positioning of the servo read head and one or more data recording/reading heads.

Figure 11:
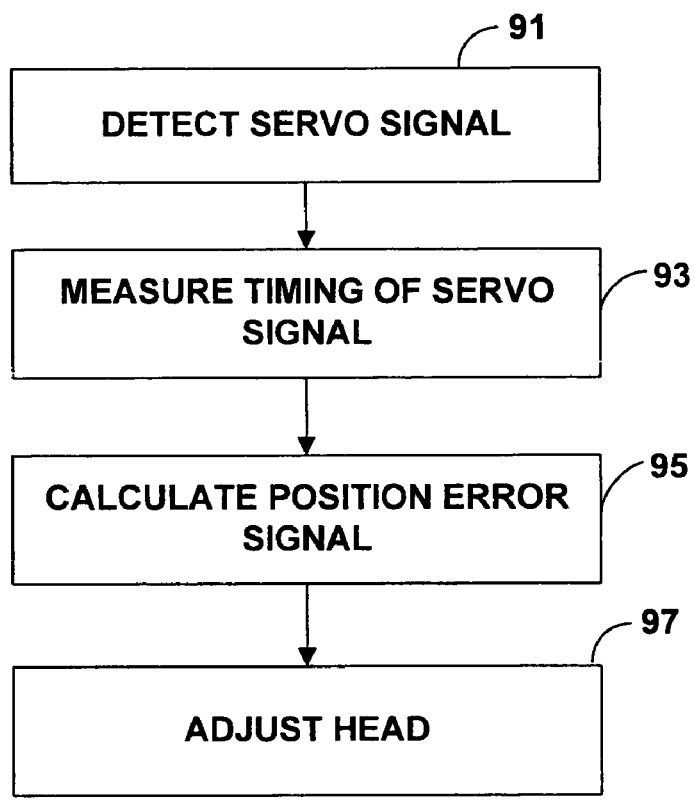
FIG. 11 is a flow diagram illustrating a time-based method for adjusting a servo head's position according to an embodiment of the invention.

FIG. 11 is a flow diagram illustrating a time-based method for adjusting a servo head's position according to an embodiment of the invention. As shown, a servo read head detects a servo signal (91). This detected servo corresponds to a servo mark having a non-uniform width. Next, a servo controller measures the length of time the servo signal is detected (93). Then, the servo controller calculates a PES based on the measured length of time the servo signal is detected (95). The PES calculation may contain calibration inputs based on the length of time other servo signals were detected, which can precisely account for media velocity and variance between media velocity in different readout systems. An actuator may adjust the servo head and one or more data heads based on the PES from the servo controller (97). The procedure of FIG. 10 may be repeated in closed-loop fashion, to maintain precise positioning of the servo read head and one or more data recording/reading heads. Furthermore, the procedures of FIGS. 10 and 11 may be used simultaneously for redundant calculation of PESs, which may improve precision and provide redundancy.

FIG. 12A is a top view of exemplary servo head 100 comprising constant width write gaps 104 and 106, and variable width write gap 108. FIG. 12B is a cross-sectional conceptual view of the exemplary servo head illustrated in FIG. 12A. Servo head 100 is configured to record a servo pattern on magnetic media. In particular, servo head 100 may be used to create a servo pattern similar to that of servo pattern 31 in FIG. 3.

Controller 74 (FIG. 9) applies electrical signals to servo head 100 via coil 118 in order to generate magnetic fields across gaps 104, 106 and 108. For example, electric pulses may be applied to servo head 100 via coil 118 in order to generate magnetic fields across gaps 104, 106 and 108.

The magnetic layer 102 may be formed or etched to define gaps 104, 106 and 108, that in turn define the servo pattern. For example, magnetic layer 102 may comprise a magnetically permeable layer that is deposited over electromagnetic element 116 via masking techniques to define patterns of gaps as described herein. Alternatively, magnetic layer 102 may comprise a magnetically permeable layer deposited over electromagnetic element 116 and then etched to define patterns of gaps. Also, magnetic layer 102 may be pre-formed to define the gaps and then adhered to electromagnetic element 116 to define servo head 100. In other embodiments, gaps 104, 106 and 108 may be formed directly in electromagnetic element 116 to define servo head 100.

In operation, servo head 100 generates timed pulses of magnetic signals to write gaps 104, 106 and 108, and as the magnetic tape passes relative servo head 100. With the magnetic tape moving relative to servo head 100, the timed pulses of magnetic fields from write gaps 104, 106 and 108 leave recorded servo marks to create a servo frame on the magnetic tape, similar to servo frame 43 in FIG. 4, for example. If desired, additional servo heads may be used with servo head 100 for simultaneous creation of servo frames on additional servo bands. In alternative embodiments, write gaps 104, 106 and 108 may be part of separate write heads such that the servo pattern may be varied to allow for encoding linear positioning information or servo band identification.

The field strengths from write gaps 104, 106 and 108 can be selected based on the magnetization curve of the medium being recorded. In particular, to allow for amplitude-based decoding, the field strengths should be strong enough to affect the medium, but not too strong so as to saturate the medium. By selecting the field strengths to lie in a non-saturated portion of the magnetization curve of the medium, the varying field strength of the gaps can be preserved in the recorded servo marks.

FIG. 13A is a top view of an exemplary servo head module 120 comprising a first head 123 and a second head 121 separated by a conductive shield 122. FIG. 13B is a side view of the exemplary servo head 120 illustrated in FIG. 13A. First head 123 and second head 121 are configured to record a plurality of servo frames on a magnetic tape. In particular, heads 123 and 121 may be used to create plurality servo frames similar to servo frame 43 in FIG. 4.

First head 123 includes write gap 124. Second head 121 includes a first erase gap 125 having a constant width, a second erase gap 126 having a constant width, and a third erase gap 127 having a non-uniform width, very similar to servo head 100 in FIG. 12A. The erase gaps 125, 126 and 127 may be formed in a magnetic layer 139 over an electromagnetic element. If desired, additional servo heads may be added to servo module 120 for simultaneous creation of servo patterns on additional servo bands, similar to servo heads 41 on servo module 45 in FIG. 4.

In operation, first servo head 123 generates a generally continuous DC or periodic magnetic signal at write gap 124 to record a servo carrier signal on a servo band of a magnetic tape as the magnetic tape passes relative to heads 123 and 121. Conductive shield 122 is positioned between first head 123 and second head 121 in order to eliminate electrical or magnetic interaction between the heads. Second head 121 generates timed pulses of magnetic fields at erase gaps 125, 126 and 127 as the magnetic tape passes relative to heads 123 and 121. With the magnetic tape moving relative to module 120, the timed pulses of magnetic signals at erase gaps 125, 126 and 127 erase the recorded signal to create a plurality of servo frames similar to servo frame 43 in FIG. 4.

In particular, a direct current electrical signal pulse may be applied to head 121 through coil 137, or alternatively, an alternating signal pulse of substantially different frequency than that applied to head 123 may be applied to head 121 through coil 137. In either case, gaps 124 are arranged to define the servo pattern as described herein.

Various embodiments of the invention have been described. For example, a servo pattern that facilitates servo PES calculations using time-based methods, amplitude-based methods, or both has been described. Moreover, servo head configurations and recording techniques have also been described. Nevertheless, various modifications may be made without departing from the scope of the invention. For example, in some embodiments, a servo pattern would not require additional servo marks along with a non-uniform width servo mark. In other cases, a servo frame may comprise two or more trapezoidal servo marks. A second mark may be inverted relative to a first mark to allow a controller to have input for calibration. These and other embodiments are within the scope of the following claims.

The invention claimed is:

1. A data storage tape comprising a servo pattern, the servo pattern including a servo mark, wherein the servo mark was recorded by only one gap of a servo head, wherein the gap has a non-uniform width, wherein a width of the servo mark defined in a down-tape direction is non-uniform across the tape.

2. The data storage tape of claim 1, wherein an amplitude of magnetization of the servo mark varies in a cross-tape direction as a function of the width.

3. The data storage tape of claim 2, wherein the width and the amplitude of magnetization vary substantially linearly in the cross-tape direction.

4. The data storage tape of claim 1, further comprising:
a servo track; and
one or more data tracks, wherein the servo pattern resides in the servo track, and wherein the data tracks are located defined distances from the servo track.

5. The data storage tape of claim 4, wherein the servo track is substantially magnetized in a first direction and the servo pattern is substantially magnetized in a second direction.

6. The data storage tape of claim 4, wherein the servo track is substantially randomly magnetized and the servo pattern is substantially magnetized in a common direction.

7. The data storage tape of claim 1, wherein the width of the servo mark varies over a length of the servo mark by greater than approximately 2 micrometers.

8. The data storage tape of claim 1, wherein the width of the servo mark varies over a length of the servo mark by less than approximately 10 micrometers.

9. The data storage tape of claim 1, wherein the width of the servo mark varies from a first width greater than approximately 6 micrometers to a second width less than approximately 4 micrometers.

10. A data storage tape comprising a servo pattern, the servo pattern including a servo mark recorded by a non-uniform gap of a servo head, wherein a width of the servo mark defined in a down-tape direction is non-uniform across the tape, wherein the servo mark has a trapezoidal shape, wherein the trapezoidal shape has exactly two parallel sides, the two parallel sides being parallel to an edge of the data storage tape.

11. The data storage tape of claim 10, wherein an amplitude of magnetization of the servo mark varies in a cross-tape direction as a function of the width.

12. The data storage tape of claim 10, wherein the width of the servo mark varies over a length of the servo mark by greater than approximately 2 micrometers.

13. The data storage tape of claim 10, wherein the width of the servo mark varies over a length of the servo mark by less than approximately 10 micrometers.

14. The data storage tape of claim 10, wherein the width of the servo mark varies from a first width greater than approximately 6 micrometers to a second width less than approximately 4 micrometers.

15. A data storage tape comprising a servo pattern, the servo pattern including a servo mark recorded by a non-uniform gap of a servo head, wherein a width of the servo mark defined in a down-tape direction is non-uniform across the tape, wherein the servo mark is a first servo mark, the servo pattern further comprising:
- a second servo mark defining a substantially constant width of X; and
- a third servo mark defining a substantially constant width of Y.

16. The data storage tape of claim 15, wherein the width of the first servo mark varies from X to Y.

17. The data storage tape of claim 15, wherein an amplitude of magnetization of the servo mark varies in a cross-tape direction as a function of the width.

18. The data storage tape of claim 15, wherein the width of the servo mark varies over a length of the servo mark by greater than approximately 2 micrometers.

19. The data storage tape of claim 15, wherein the width of the servo mark varies over a length of the servo mark by less than approximately 10 micrometers.

20. The data storage tape of claim 15, wherein the width of the servo mark varies from a first width greater than approximately 6 micrometers to a second width less than approximately 4 micrometers.

* * * * *